March 27, 1928.

W. M. VENABLE 1,663,574

APPARATUS FOR HANDLING BULK MATERIALS

Filed Dec. 1, 1924   2 Sheets-Sheet 1

Inventor
William Mayo Venable
By his Attorneys
Syrnestvedt & Lechner

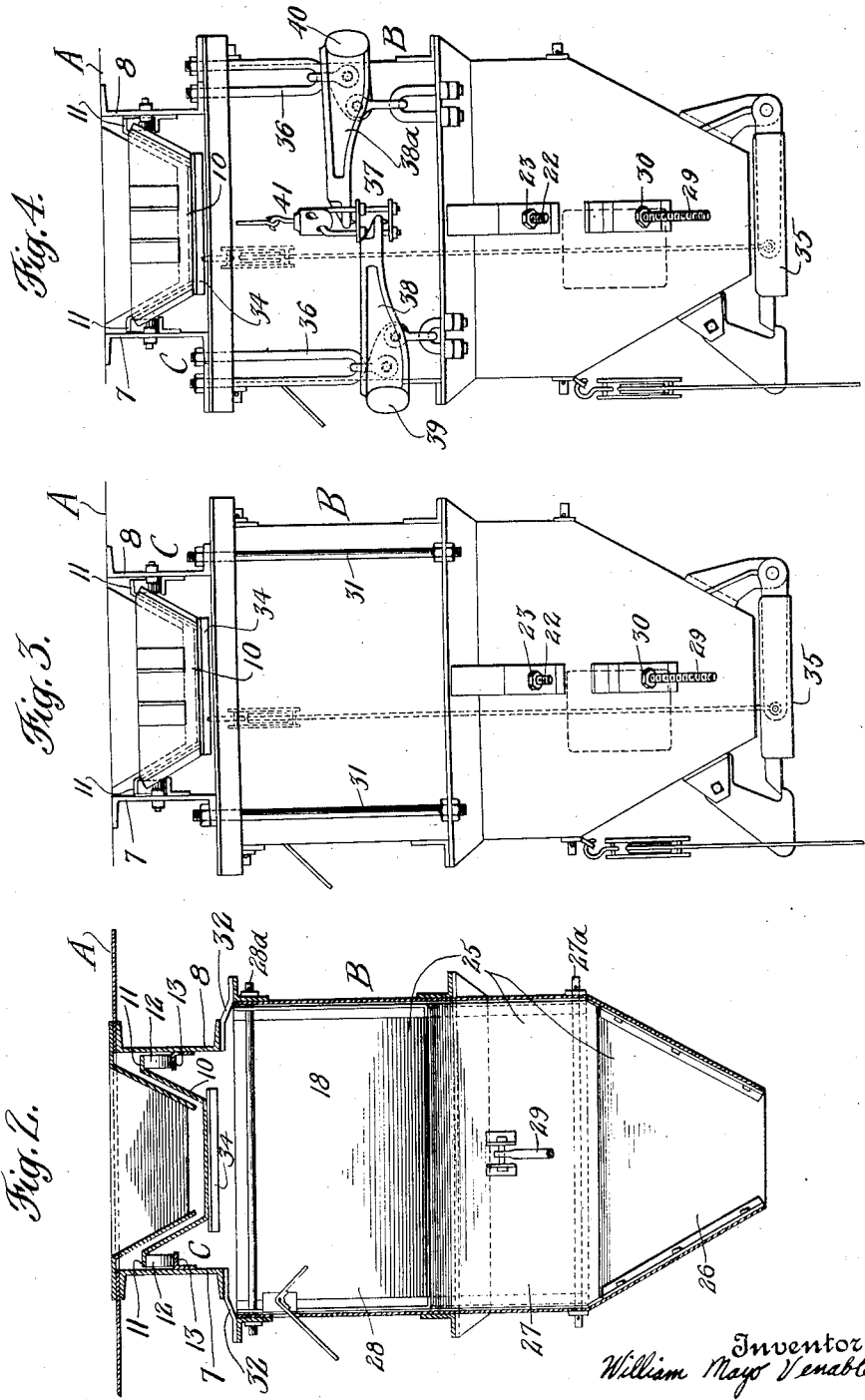

Patented Mar. 27, 1928.

1,663,574

UNITED STATES PATENT OFFICE.

WILLIAM M. VENABLE, OF PITTSBURGH, PENNSYLVANIA, ASSIGNOR TO BLAW-KNOX COMPANY, A CORPORATION OF NEW JERSEY.

APPARATUS FOR HANDLING BULK MATERIALS.

Application filed December 1, 1924. Serial No. 753,014.

This invention relates to apparatus for measuring bulk materials such as sand, stone and cement used in concrete mixtures into definite batches, and it is particularly concerned with the simplification and improvement of apparatus of this character. As an example of existing apparatus for the above purpose reference may be had to my co-pending application Serial No. 706,139, filed April 12, 1924.

One of the primary objects of the invention is the provision of a batching device which may be changed from a bulk measurer to a weight measurer with a minimum of expense and trouble.

Another object is the provision of a device in which the volumetric capacity of the measuring hopper may be altered in a simple and convenient manner.

Still another object of the invention is to so construct the measuring unit that it may be rigidly suspended for measurement by volume or floatingly suspended for measurement by weight, by substituting scales means for the rigid hanger means.

A further object of the invention is to make it possible to measure out the materials with great accuracy but still in the minimum amount of time, as, for example, by measuring out the approximate quantities by volume of each or either of two materials, and completing the measurement of one or both the materials by weight.

Still another object is the provision of simple and inexpensive means for hanging the material control gates.

Still another object is the provision of a conveniently located member adapted when in place to prevent materials in adjacent compartments from intermingling and when removed to allow a portion of the material in one compartment to discharge into the other compartment.

With the foregoing and related objects in view, the invention consists in the novel construction, combination and arrangement of parts hereinafter described and claimed.

In the accompanying drawings illustrating by invention

Fig. 2 is a cross section taken substantially on the line 2—2 of Fig. 1;

Fig. 3 is an end view of Fig. 1 looking toward the left and showing the apparatus in condition for bulk measurement; and Fig. 4 is a similar end view but showing the apparatus in condition for weight measurement.

Figure 1:
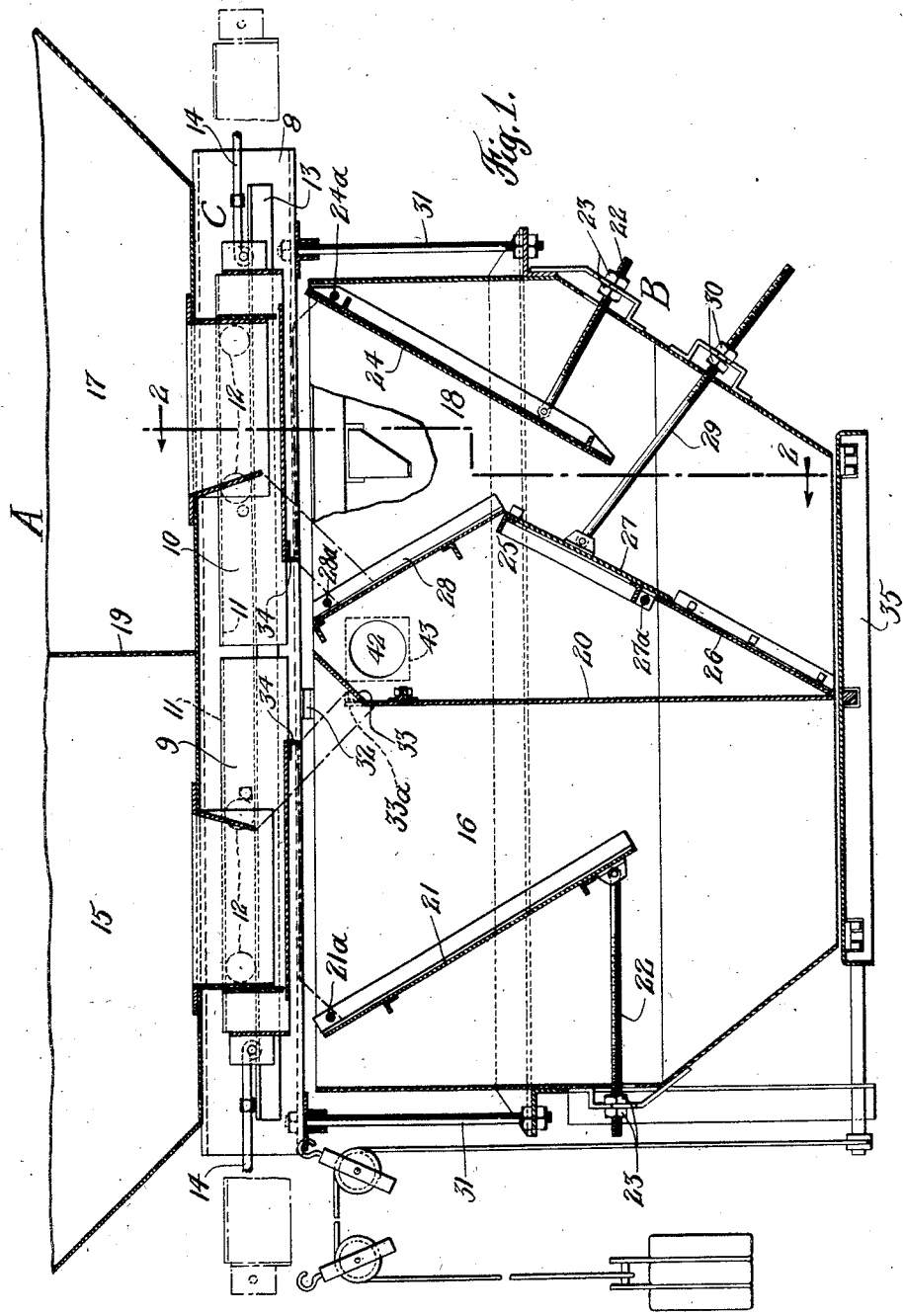
Fig. 1 is a longitudinal section thru an apparatus embodying my invention.

Referring to the drawing it will be seen that the apparatus in general, comprises a bin A, a hopper B and gate mechanism C for controlling the delivery of material from the bin to the hopper. The gate mechanism C is slidably supported by a pair of spaced standard channel irons 7 and 8 carried by the bin and interposed between the bin and the hopper. The hopper B is greater in width than the distance between the channel irons and the top thereof is at a level slightly below the bottom of the channel irons. By so arranging these parts I am enabled to use the standard channels and thereby lower the cost of manufacture to a considerable degree. The gate mechanism C comprises a pair of oppositely moving substantially trough shaped gates 9 and 10 having their upper edges bent outward to present flattened portions 11 for engagement with anti-friction rollers 12 which roll on the tracks 13 secured to the channel irons 7 and 8. Suitable operating means are provided for the gates, in this instance shown in the form of a rod 14 extending outward from each gate to a point within convenient reach of the operator. Manipulation of the gate 9 controls the discharge of material from the compartment 15 of the bin to the compartment 16 of the hopper and manipulation of the gate 10 controls the discharge of material from the compartment 17 of the bin to the compartment 18 of the hopper, the bin being divided into compartments by a partition 19 and the hopper by a partition 20.

When the device is used for measuring batches of ingredients for concrete mixtures, the bin compartment 15 is supplied with broken stone and the other bin compartment 17 with sand. The hopper compartment 16 which is in registry with the discharge opening of the compartment 15 is adjustable as to its volumetric capacity by means of a baffle wall 21 pivoted at 21ª having control means 22 secured thereto at its free end which may be locked into position of adjustment by the nuts 23, the member 22 extending thru the wall of the hopper as shown. Thus it will be seen that by adjusting the baffle wall 21, the effective volumetric capacity of the compartment 16 may be altered to suit a given requirement. In other words without actually changing the size of the hopper I provide a very simple means for changing its effective capacity. The saving in number of parts is very material with its consequent saving in cost and of time necessary to make adjustment.

The volumetric capacity of the sand compartment 18 of the hopper may be similarly altered by means of the baffle wall 24 pivoted at 24ᵃ. In addition to this adjustment of the compartment 18 I have provided another baffle wall 25 opposed to the baffle wall 24 and composed of a detachable member 26, and two detachable pivoted members 27 and 28 respectively pivoted at 27ᵃ and 28ᵃ, so that their free ends are adjacent. The lower pivoted member 27 is provided intermediate its ends with control means 29 extending thru the wall of the hopper as shown, which may be locked in position of adjustment by the nuts 30. The free end of the upper pivoted member 28 overlaps the free end of the member 27 so that adjustment of the member 27 positions the member 28 which leans against the member 27 by gravity. By such an arrangement of double baffle walls a much greater range of adjustment may be had over an arrangement using a single baffle and this without obstructing the opening beneath the gate or an opening somewhere within the compartment to an undue degree, which would prevent the proper flow of material into and out of the device.

Referring to Fig. 2 it will be noted that the baffle walls are of the full width of the compartment so that they may be swung readily lengthwise thereof an thus in effect reduce the average length of the compartment by an amount sufficient to regulate the quantity of sand when bulk measurement is relied upon. The length of the gate opening and the travel of the gate is sufficient to permit material to flow into the compartment readily and the slope of the baffle walls and the side of the container at the bottom is such as will insure proper dicharge of the material without bridging or sticking.

As shown in Fig. 1 the hopper B is rigidly suspended by means of the detachable hanger bolts 31, additional bracing 32 being provided if desired at the top of the hopper to further insure rigidity.

The partition wall 20 hereinbefore mentioned terminates short of the top of the hopper for a purpose to be hereinafter described and is provided with a detachable extension member 33 which serves to extend the wall upwardly to a sufficient height to prevent the material, in its natural slope when the hopper is filled, from discharging into the adjacent compartment.

The device as thus far described is adaptable for measurement by volume in the following manner.

The baffle walls 21, 24 and 25 of the compartments 16 and 18 respectively are adjusted to such position that the volume of the effective portion of the compartments equals the volume of the batch of material to be measured out. The gates are then opened wide allowing materials from the bin compartments to discharge into the hopper compartments by gravity until no more will enter, whereupon the gates are closed. In closing the gates it will be observed that the cross members 34 adjacent the inner edges of the bottom of the gates strike off the material in their path thus disassociating the material in the bin from the hopper and filling in a material part of the void spaces adjacent the partition wall 20 at the top. Then the lower gate 35, which is common to both compartments 16 and 18, is opened and the materials discharge.

If desired to measure the materials by weight the hanger bolts 31 are detached and the U bent hanger bolts 36 are substituted therefor (see Fig. 4) from which the hopper is floatingly suspended thru the medium of the scales device 37. In the scale arrangement shown the scales levers 38 and 38ᵃ are connected to the beams 39 and 40 respectively which extend longitudinally of the apparatus and have similar scales levers connected thereto at the opposite side of the apparatus. A suitable connection 41 is made between the scales levers 38 and 38ᵃ and the indicating mechanism of the scale (not shown).

When measuring by weight the set of baffle members constituting the baffle wall 25 may be removed entirely, thus making the compartment 18 large enough to receive both sand and cement. The compartment, however, is still adjustable by the adjustable baffle wall 24. The detachable extension member 33 may also be removed and replaced by the member 33ᵃ shown in Fig. 1 in dotted lines, to allow some of the stone in the stone compartment to discharge over the partition wall 20 as the gate 9 is being closed, into the sand compartment, for the purpose of preventing the cement from adhering to the gate.

The hopper compartment 18 is provided with an opening 42 thru which cement may be introduced by suitable means in the amount desired and determinable by the weight registered on the scale, it being understood of course that the opening 42 is not used for the introduction of cement except when the detachable baffle wall 25 or the portion 26 thereof is removed. The opening 42 may be closed off when not in use by means of the cover plate 43.

When measuring by weight the baffle wall 24 is adjusted in such a position that when the gate is opened wide the weight of sand that will enter by gravity is a little less than the amount required. Then by working the gate backward and forward sufficient additional sand may be fed in carefully and under full control until exactly the required weight is obtained. Were the baffle wall not used the measuring hopper would quickly fill up completely upon opening the gate, thereby often necessitating the operators removing a portion of the material to bring what is contained in the measuring hopper down to the weight desired. The baffle wall thus serves to prevent an excessive amount of sand being introduced when the gate is opened to full width. This results in a saving of time, as the process of feeding in the last few hundred pounds of sand under such control helps to give exactly the weight required without the danger of withdrawing too much.

From the foregoing it will be seen that I am enabled to measure materials by volume with provision for adjusting the volume of either or both materials independently, and by weight by introduction of a scale in place of hanger bolts which support the measuring hopper when the scale is not required. It is also adapted for measuring either material or both materials, both by volume and weight, or one material first by volume and then by weight and the other by weight only.

It is also obvious that, employing my invention, there may be an approximate measuring of each or either of two materials by volume, and a completion of the correct or accurate measurement of either or both of the materials by weighing. For example, in some cases it might be preferable to measure out the stone for a concrete batch by volume, to measure out only the approximate corresponding quantity of sand by volume, and then to add sand by weight until the exact amount required is obtained. This method, carried out with the present apparatus, results in shortening the time required for measuring, and, at the same time, maintains a sufficient degree of accuracy for many kinds of work. Time is saved because the larger proportion of the materials is measured by volume, which is easier and quicker than weight measurement, since, with the latter, the filling operation must be slowed down; and accuracy is maintained because the completion of the measurement of the sand (which is subject to greater fluctuations in weight per unit of volume than the coarser aggregate because of its wider range of moisture absorption) is done by weight.

Under conditions where the characteristics of the various materials remain more or less constant from batch to batch, the apparatus may be adjusted to measure the proper proportions by bulk entirely, the weighing device being used only occasionally or periodically to check up on the condition of the materials, for example, the condition of the sand as to moisture.

It will be apparent therefore that my device can be used under practically any conditions, merely omitting the scale and substituting hangers where the scale is not required thus enabling a contractor to avoid the purchase of different equipment.

The desirability of a batcher which can be used without any change other than the application of the scale and minor adjustment, for measurement either entirely by bulk or partly by bulk and partly by weight, is apparent because the practice of engineers and the requirements and specifications at the present time differ as to methods of measurement to such an extent that in one locality a contractor may have to measure by volume only and in another by weight only and in a third by volume and weight and it is, therefore, highly desirable that he shall be able to apply the same equipment for any of these methods when he happens to do work in one locality under one set of requirements and then in another where the requirements differ.

I claim:—

1. A batcher device comprising in combination, a bin divided into compartments for coarse and fine aggregate, a hopper therebelow divided into compartments by a partition each compartment of the hopper being in registry with a compartment of the bin, means for altering the effective volumetric capacity of the hopper compartments, gate means for controlling the discharge from the bin compartments to the hopper compartments and means for discharging the contents of said hopper.

2. A batching apparatus including a bin, divided into compartments, a gate controlled opening for each compartment, a hopper divided into compartments, one for each bin compartment, said hopper compartments being adapted to receive materials from their respective bin compartments, adjustable means for altering the effective volume of the hopper compartments, and a common discharge gate for discharging material contained in the hopper.

3. A batcher device comprising in combination, a supply bin for aggregate, a measuring hopper therebelow, a partition in said hopper, an adjustable baffle for altering the effective volumetric capacity of the hopper, a portion of said baffle being detachable, and means whereby aggregate from another source of supply is introduced to said hopper between the baffle and the partition.

4. A batching apparatus comprising in combination, a supply bin, a measuring hopper therebelow having means for altering its volumetric capacity and means whereby said hopper may be suspended either fixedly for batching by volume or floatingly for batching by weight.

5. A batcher device including a bin, a hopper in association therewith, a discharge opening from the bin, a gate for controlling the discharge from said bin, a pair of spaced gate hangers between the bin and hopper comprising standard channel irons, suspension means for the hopper detachably secured to the channel irons and a gate controlled discharged opening for the hopper.

6. A batcher device comprising in combination, a supply bin for aggregate, a measuring hopper therebelow, having means for altering its effective volumetric capacity, a gate at the bottom of said bin, and a hanger for the gate composed of a pair of spaced channel irons of standard cross section.

7. A batcher device comprising in combination, a divided supply bin, a measuring hopper therebelow in registry therewith, a fixed partition dividing said hopper into two compartments and terminating short of the top of the hopper and a detachable partition section for increasing the height of the fixed partition.

8. A measuring hopper provided with a pair of opposed adjustable baffles for altering the effective capacity of the hopper, one of said baffles having a detachable portion, means for admitting material behind said baffle into the hopper, and independent means for operating each baffle.

9. A measuring hopper provided with a pivoted baffle wall, a second baffle wall composed of a detachably fixed section, and two detachable pivoted sections so positioned that their free ends are adjacent, and independent means for adjusting each baffle wall to alter the effective volumetric capacity of the hopper.

10. A measuring hopper including independently adjustable compartments, and a single discharge gate for both compartments operable to open both compartments simultaneously.

11. A measuring hopper including an adjustable baffle wall for altering the capacity of the hopper composed of a pair of members pivoted so that their free ends are adjacent, and means for adjusting one of the members, the other member overlapping said member so as to be positioned by gravity when said member is adjusted.

12. A batching apparatus comprising in combination a material supply bin, a delivery opening therein, a gate therefor, a hopper therebelow having a pair of measuring compartments with a partition between them, one of said compartments being in registry with said bin opening, and means adapted to vary the effective height of the partition so that all the material may be delivered into the one compartment or a portion of it may be discharged into the other compartment.

13. A batching apparatus comprising in combination a material supply bin, a delivery opening therein, a gate therefor, a hopper therebelow having a pair of measuring compartments with a partition between them, one of said compartments being in registry with said bin opening, means adapted to vary the effective height of the partition so that all the material may be delivered into the one compartment or a portion of it may be discharged into the other compartment, and means for delivering other material to said latter compartment from another source of supply.

14. A batcher device comprising in combination a supply bin, a discharge opening therein, a reciprocable gate therefor having a strike-off member, a measuring hopper therebelow, weighing means for the hopper, and means for adjusting the capacity of the hopper for any predetermined effective volume, said strike-off member being adapted to discharge additional material into said hopper when the gate is reciprocated.

In testimony whereof, I have hereunto signed my name.

WILLIAM M. VENABLE.